US012038614B2

(12) United States Patent
Yamada et al.

(10) Patent No.: US 12,038,614 B2
(45) Date of Patent: Jul. 16, 2024

(54) OPTICAL FIBER ARRAY AND CONNECTING METHOD THEREOF

(71) Applicant: Nippon Telegraph and Telephone Corporation, Tokyo (JP)

(72) Inventors: Takashi Yamada, Musashino (JP); Yuichiro Ikuma, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 352 days.

(21) Appl. No.: 17/623,539

(22) PCT Filed: Jul. 8, 2019

(86) PCT No.: PCT/JP2019/027045
§ 371 (c)(1),
(2) Date: Dec. 28, 2021

(87) PCT Pub. No.: WO2021/005694
PCT Pub. Date: Jan. 14, 2021

(65) Prior Publication Data
US 2022/0357526 A1  Nov. 10, 2022

(51) Int. Cl.
*G02B 6/40* (2006.01)
*G02B 6/36* (2006.01)
*G02B 6/38* (2006.01)

(52) U.S. Cl.
CPC .......... *G02B 6/403* (2013.01); *G02B 6/3636* (2013.01); *G02B 6/3893* (2013.01)

(58) Field of Classification Search
CPC .... G02B 6/403; G02B 6/3636; G02B 6/3893; G02B 6/40; G02B 6/30
See application file for complete search history.

(56) References Cited

U.S. PATENT DOCUMENTS

| 5,301,252 A | 4/1994 | Yanagawa et al. |
| 10,061,084 B1 * | 8/2018 | Takayama ................ G02B 6/30 |

(Continued)

FOREIGN PATENT DOCUMENTS

| JP | H05-88038 A | 4/1993 |
| JP | 2006-323210 A | 11/2006 |
| JP | 2018-141975 A | 9/2018 |

*Primary Examiner* — Jennifer Doan
(74) *Attorney, Agent, or Firm* — Workman Nydegger

(57) ABSTRACT

There is provided an optical fiber array that can be easily optically connected to cores of optical waveguides on a connection counterpart substrate without requiring a complicated fabrication process to the connection counterpart substrate and laborious diffusing fusion of the cores. In an array, coating-removed exposed portions of fibers are attached to grooves that are provided on a lower substrate in order to position the optical fibers. Further, the exposed portions are pressed by a lid. Coated portions of the fibers are placed on a flat surface of a concave portion that is provided on the substrate to form a step with the grooves in a state where the exposed portions are attached. Front end parts of the exposed portions of the fibers each have a light collecting portion that collects light beams passing through an inside of the corresponding fiber to reduce an MFD. The light collecting portions are lens-shaped portions that are formed by cutting and are used for optical alignment with the cores of the optical waveguides.

6 Claims, 7 Drawing Sheets

(56) References Cited

U.S. PATENT DOCUMENTS

| | | | |
|---|---|---|---|
| 2004/0042756 A1* | 3/2004 | Yokomachi | G02B 6/4224 385/137 |
| 2015/0139589 A1* | 5/2015 | Sakai | G02B 6/3807 385/76 |
| 2016/0341919 A1 | 11/2016 | Liu et al. | |
| 2018/0246278 A1 | 8/2018 | Takayama et al. | |

* cited by examiner

OPTICAL FIBER ARRAY AND CONNECTING METHOD THEREOF

TECHNICAL FIELD

The present invention relates to an optical fiber array that is effective to reduce an optical connection loss when an optical signal transmission/reception optical fiber is connected to an optical device having a minute light beam diameter, and to a method of connecting the optical fiber array.

BACKGROUND ART

In recent years, along with diversification of schemas for optical communication and increase in communication capacity, it is necessary to develop a highly functional optical module that can perform high-speed optical signal processing. For example, in a transmission system at more than 100 Gbit/S, a transmission distance can be extended by a digital coherent technique adopting ultrahigh-speed digital signal processing. In such a transmission system, however, a modulator/demodulator has a complicated configuration because the transmission system uses polarization multiplexing technique and multi-value modulation technique. Therefore, there is a demand for improvement in accuracy of optical integration technique.

Optical modules serving as keys of a small-sized transceiver adopting the digital coherent technique are an IQ (Inphase-Quadrature) modulator that can simultaneously modulate intensity and a phase of light, and an integrated coherent receiver that receives an optical signal. To further reduce sizes and power consumption of these optical modules, a small-sized assembly in which these key optical components are integrated on one chip of a silicon substrate by a silicon photonics technique, attracts attention. Examples of the small-sized assembly include a small-sized coherent optical subassembly (COSA).

The silicon photonics technique uses a micromachining technique fostered by an existing LSI (large-scale integrated circuit technique. Further, the silicon photonics technique utilizes, as an integrated circuit platform, silicon transparent in a wavelength band of 1.55 μm that is a communication wavelength band. In recent years, an optical modulator, a light reception device using germanium, and the like are integratable on a silicon substrate, and performance of the above-describe small-sized coherent optical subassembly is rapidly improved.

In the small-sized coherent optical transceiver adopting the silicon photonics technique, the optical modulator is integrated on a transmission side, and the integrated coherent receiver is integrated on a reception side. Further, an output optical fiber and an input optical fiber serving as optical interfaces are connected to end surfaces of an optical waveguide. Furthermore, as a light source on the transmission side and a local light source of the integrated coherent receiver on the reception side, tunable lasers each having a narrow line width are connected. To establish connection to the tunable lasers, polarization holding fibers are connected to the end surfaces of the optical waveguide. Therefore, three or more optical fibers are necessary.

The optical waveguide formed by such a technique is small in mode field diameter (hereinafter, referred to as MFD) of propagating light. Even when a structure extending the MFD is provided on the end surfaces of the optical waveguide, the size of the MFD is about 4 μm in a horizontal direction and about 2 μm in a vertical direction. The size is about ¼ of 10 μm that is a core diameter of a common optical fiber. Accordingly, as in a case where the optical fibers are connected to the well-known optical waveguide substrate made of quartz glass, the method of connecting the end surfaces through butt joint may cause an optical coupling loss of about 3 dB. Therefore, to reduce the optical coupling loss, the structure extending the MDF of the light is necessary on the silicon substrate side, whereas a structure reducing the MFD of the light is necessary on the optical fiber side.

Further, in a case where the optical waveguide substrate and the optical fibers different in MFD of the light are connected, any structure converting the MFD of the light as an optical module is necessary in order to reduce an optical insertion loss. Some techniques to realize such a structure have been proposed.

For example, there is a spot-size converter (see Patent Literature 1) that discloses a method of providing an MFD conversion portion by changing a cross-sectional structure at each of an input portion and an output portion of the optical waveguide on the optical waveguide substrate. Further, as another example, there is a mode field conversion fiber component (see Patent Literature 2) that discloses a method of providing an MFD conversion portion by gently changing core diameters of the optical fibers having different MFDs and fusing the optical fibers.

CITATION LIST

Patent Literature

Patent Literature 1: Japanese Patent Laid-Open No. 2006-323210

Patent Literature 2: Japanese Patent Laid-Open No. 5-88038

SUMMARY OF THE INVENTION

Technical Problem

In the above-described method disclosed in Patent Literature 1, the MFD conversion portion is commonly fabricated by gradually increasing the width of the optical waveguide in a tapered shape or gradually reducing the width of the optical waveguide to cause ooze of light, which extends the MFD mainly in a horizontal direction. Further, the MFD is extended in a vertical direction by changing the height of the optical waveguide in a slope shape as in the horizontal direction. For example, in the optical waveguide substrate made of quartz glass, a method of forming a slop by imparting gradation to a photoresist to change an etching amount is known.

To make the slope in the vertical direction by the etching, it is necessary to transfer the gradation to the photoresist by making a metal pattern of a photomask in an island shape and imparting the gradation based on difference in density. Accordingly, high accuracy in photomask fabrication and high performance of the photoresist are necessary, and a manufacturing cost is increased due to rigidity and complication of the etching process.

Further, in the optical waveguide substrate using the silicon photonics technique, there is a known method in which an upper clad layer is removed by etching, another optical waveguide substrate for extending MFD using an optical polymer is bonded to a top surface of an exposed optical waveguide layer, and beams are transited to the polymer waveguide side in such a state to perform MFD conversion. In a case where different types of waveguide substrates are bonded, however, positioning accuracy over an entire wafer is necessary, which may lower a yield.

In the method disclosed in Patent Literature 2, it is necessary to connect the optical fibers different in core diameter by fusion. In such a method, the MFD conversion portion is fabricated by heating and melting a core of the optical fiber having a small core diameter by electrical discharge machining or by using a burner, and increasing the core diameter up to a core diameter of the optical fiber having a large core diameter in a tapered shape. A position where the MFD conversion portion is disposed is most important to determine a size of the optical module. The MFD conversion portion is commonly disposed at an intermediate portion of each of input/output fibers of the optical module, namely, at a routing portion of each of the optical fibers from the optical connector to the input portion and the output portion of the optical module.

In such a form, however, a sleeve for reinforcing a fused portion is necessary. In a case of an apparatus requiring a plurality of optical fibers, such as the coherent optical transceiver, the reinforcing sleeves corresponding to the number of optical fibers are necessary, which causes an issue that the reinforcing sleeves occupy a mounting volume. Further, in a case where the plurality of optical fibers are fused while being adjusted to the same length, the yield of the optical module fabrication may be lowered by failure of cleave cut, a loss error in fusion, and the like.

As the other method, a method in which a core diffusion fused portion is disposed inside a ceramic ferrule of the optical connector or inside an optical fiber array is known. When the fused portion of the optical fiber is disposed in a minute region, however, defects such as positional deviation and eccentricity of cores may be likely to occur inside a ferrule hole or a V-shaped groove of the fiber array due to various factors. Examples of the factors include manufacturing variation of a clad outer diameter of the optical fiber, difference of a core eccentric amount, and swelling of the clad outer diameter due to melting.

Further, in a case where the optical fiber is set in an optical fiber fusing device, cleave cut is performed to remove coating of the optical fiber. At this time, it is necessary to suppress a length of a bare fiber from a coating-removed end to a cleave cut end surface of the optical fiber, to about 2 mm in order to fit a coated portion into a housing of the optical connector or into the fiber array. In such a case, it is necessary to perform special short cut different from a normal method using a cleave cutter. The cleave cut for the short length of the bare fiber additionally requires a cutting step using a laser, a dicing saw, or the like, which makes the process complicated.

Embodiments of the present invention have been made to solve such issues. An object of the embodiments of the present invention is to provide an optical fiber array that can be easily optically connected to cores of optical waveguides on a connection counterpart substrate without requiring a complicated fabrication step to the connection counterpart substrate and laborious diffusing fusion of the cores, and to provide a method of connecting the optical fiber array.

Means for Solving the Problem

To achieve the above-described object, an optical fiber array, comprising: optical fibers each having a coating-removed exposed portion for positioning and fixing; and an attachment substrate having grooves on which the exposed portions are attached and positioning the optical fibers, and a concave portion on which coated portions are placed, the grooves and the concave portion forming a step, wherein the grooves are formed at intervals enabling optical connection between cores of optical waveguides provided on a top surface of a connection counterpart substrate and front end parts of the exposed portions of the attached optical fibers, and the front end parts of the exposed portions of the optical fibers each include a light collecting portion that collects light beams passing through an inside of the corresponding optical fiber to reduce a mode field diameter.

To achieve the above-described object, a method of connecting an optical fiber array to optically connect cores of optical waveguides provided on a top surface of a connection counterpart substrate and front end parts of coating-removed exposed portions of optical fibers, the method comprising: machining the front end parts of the exposed portions to form light collecting portions, each of the light collecting portions collecting light beams passing through an inside of the corresponding optical fiber to reduce a mode field diameter; coating the light collecting portions with a protective member; optically aligning the cores of the optical waveguides and the light collecting portions coated with the protective member, of the exposed portions attached to grooves provided for positioning the optical fibers on an attachment substrate; bonding and fixing the connection counterpart substrate and the attachment substrate; and removing the protective member to form a gap around the light collecting portions.

Effects of the Invention

Effects of the present invention are obtainable by the configuration according to the above-described embodiment or execution of the steps according to the above-described other embodiment. As a result, it is possible to easily optically connect the optical fibers to the cores of the optical waveguides on the connection counterpart substrate without requiring a complicated fabrication step to the connection counterpart substrate and laborious core diffusing fusion.

DESCRIPTION OF EMBODIMENTS

Hereinafter, some embodiments of an optical fiber array and a method of connecting the optical fiber array according to the present invention are described in detail with reference to drawings.

Figure 1:
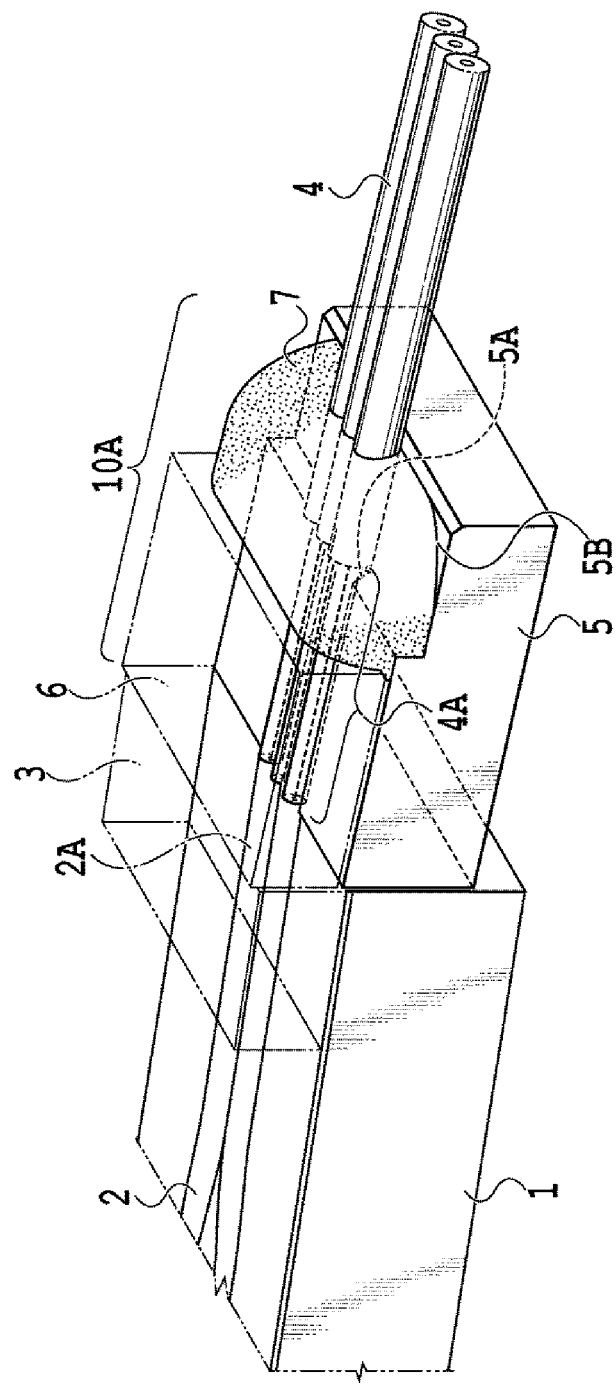
FIG. 1 is a partially-broken perspective view illustrating a basic structure of a well-known optical fiber array in a state of being coupled with a connection counterpart substrate.

To deepen understanding of the present invention, a fiber array according to a prior art is first described. FIG. 1 is a partially-broken perspective view illustrating a basic structure of a well-known optical fiber array 10A in a state of being coupled with a connection counterpart substrate 1.

As illustrated in FIG. 1, the optical fiber array 10A has a structure in which coating-removed dual-core optical fibers 4 cut into an appropriate length are arrangeable in a horizontal direction and a vertical direction with high accuracy. The number of optical fibers 4 arranged at this time may be three or more. To perform such arrangement, a lower substrate 5 serving as an attachment substrate having grooves 5A formed by grooving is used. The grooves 5A are provided side by side so as to position coating-removed exposed portions 4A of the optical fibers 4. The lower substrate 5 includes a concave portion 5B on which coated portions of the optical fibers 4 are placed. The grooves 5A and the concave portion 5B are provided to form a step.

The grooves 5A of the lower substrate 5 serving as positioning portions for the optical fibers 4 are provided at intervals enabling optical connection between cores 2A of optical waveguides 2 provided on a top surface of the connection counterpart substrate 1 and front end parts of the exposed portions 4A of the attached optical fibers 4. The number of grooves 5A is greater than or equal to the number of optical fibers 4. A cross-sectional shape of each of the grooves 5A in a direction perpendicular to an extending direction of the grooves 5A is a V-shape or a U-shape.

Further, a lid 6 is used as a plate-shaped lid member that presses and stabilizes the exposed portions 4A of the optical fibers 4 attached to the grooves of the lower substrate 5. Furthermore, to fix these members, a transparent ultraviolet (UV) curing adhesive is used. The ultraviolet curing adhesive is cured by being irradiated with ultraviolet rays, and integrally bonds and fixes the members at the time of being cured. As a result, a reinforcing member 7 is formed.

Bonding positions filled with the ultraviolet curing adhesive are as follows. The bonding positions are the concave portion 5B of the lower substrate 5 and a flat surface and an end surface of the step around the concave portion 5B, an end surface of the lid 6 on a coated portion side of the optical fibers 4, and a portion where the coated portions of the optical fibers 4 are attached on the flat surface of the concave portion 5B. After these bonding positions are filled with the ultraviolet curing adhesive, the ultraviolet curing adhesive is cured by being irradiated with ultraviolet rays, thereby integrally bonding and fixing the members.

The front end parts of the exposed portions 4A of the optical fibers 4 in the optical fiber array 10A are used for the optical connection with the cores 2A of the optical waveguides 2 provided on the top surface of the connection counterpart substrate 1. The cores 2A of the optical waveguides 2 are provided on the top surface of the connection counterpart substrate 1 made of Si or the like, so as to be coated with a clad layer. Axial centers of the cores 2A of the optical waveguides 2 are optically aligned so as to be coincident in position with axial centers of the front end parts of the exposed portions 4A of the optical fibers 4. As a result, the optical connection is performable.

In addition, a protection glass plate 3 as a protection member is disposed on the top surface of the counterpart substrate 1 on the lid 6 side. The protection glass plate 3 increases a contact area with the lid 6 to prevent foreign matters such as dust from entering the optical connection portion, in addition to prevention of crack in optical polishing of the counterpart substrate 1. However, the protection glass plate 3 and the lid 6 are not necessarily provided, and necessity of installation of the protection glass plate 3 and the lid 6 is selected depending on use environment.

In the optical fiber array 10A and the connection counterpart substrate 1 including the cores 2A of the optical waveguides 2, end surfaces of the members used for the optical connection are optically polished. Further, the axial centers of the cores 2A of the optical waveguides 2 provided on the top surface of the connection counterpart substrate 1 are coupled with the axial centers of the front end parts of the exposed portions 4A of the optical fibers 4. In the coupled state, high-reliability optical connection is realized with low optical connection loss. In other words, as illustrated in FIG. 1, the optical fiber array 10A is finally coupled with the connection counterpart substrate 1 including the cores 2A of the optical waveguides 2 through bonding and the like, and is assembled.

In the case of the optical fiber array 10A, however, measures to reduce optical coupling loss when the front end parts of the exposed portions 4A of the optical fibers 4 are optically connected to the axial centers of the cores 2A of the optical waveguides 2 of the connection counterpart substrate 1 are insufficient. To reduce the optical coupling loss, it is sufficient to reduce the necessary MFD of the light. Therefore, in embodiments, a structure to reduce the MFD of the light is embodied and provided.

Embodiment 1

Figure 2:
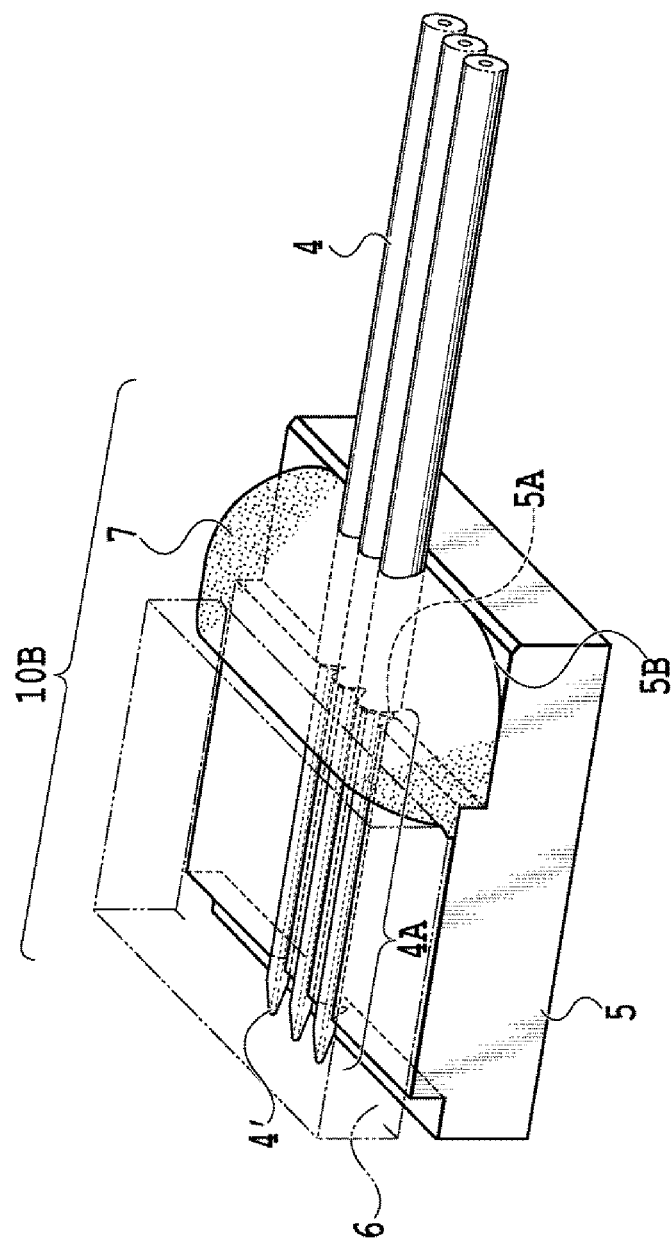
FIG. 2 is a partially-broken perspective view illustrating a basic structure of an optical fiber array according to Embodiment 1 of the present invention.
Figure 3:
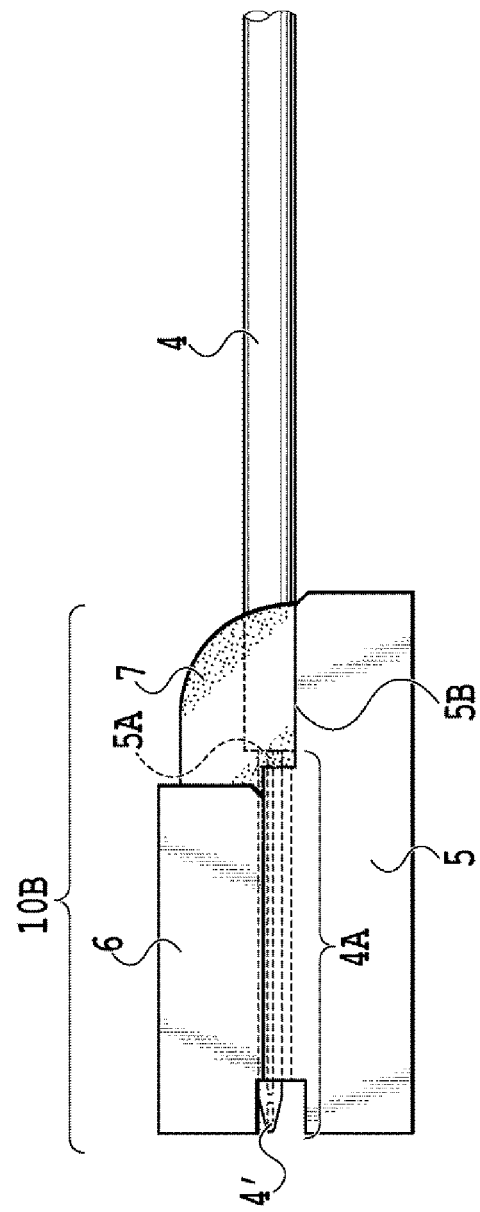
FIG. 3 is a side view of the optical fiber array illustrated in FIG. 2.

FIG. 2 is a partially-broken perspective view illustrating a basic structure of an optical fiber array 10B according to Embodiment 1 of the present invention. FIG. 3 is a side view of the optical fiber array 10B.

Referring to the drawings, the optical fiber array 10B according to Embodiment 1 is different in the front end parts of the exposed portions 4A of the optical fibers 4 from the optical fiber array 10A according to the prior art illustrated in FIG. 1. In other words, the front end parts of the exposed portions 4A of the optical fibers 4 in the optical fiber array 10B each have a light collecting portion that collects light beams passing through an inside of the corresponding optical fiber 4 to reduce the MFD. More specifically, the light collecting portions of the respective optical fibers 4 are provided as lens-shaped portions 4' that are cut in lens shapes. The cutting in this example indicates optical polishing. Although a case where the number of optical fibers 4 is three is illustrated, the number of optical fibers 4 may be two or more, or four or more.

The other components are the same as in the optical fiber array 10A. In other words, the optical fiber array 10B also has the structure in which the coating-removed optical fibers 4 cut into an appropriate length are arrangeable in the horizontal direction and the perpendicular direction with high accuracy. To perform such arrangement, the lower substrate 5 serving as an attachment substrate having the grooves 5A formed by grooving is used. The grooves 5A are provided side by side so as to position the coating-removed exposed portions 4A of the optical fibers 4. The lower substrate 5 includes the concave portion 5B on which the coated portions of the optical fibers 4 are placed, so as to form a step with the grooves 5A.

Examples of a material of the lower substrate 5 include glass and ceramics. The grooves 5A of the lower substrate 5 serving as positioning portions for the optical fibers 4 are provided at intervals enabling optical connection between the cores 2A of the optical waveguides 2 provided on the top surface of the connection counterpart substrate 1 and the front end parts of the exposed portions 4A of the attached optical fibers 4. A cross-sectional shape of each of the grooves 5A in a direction perpendicular to the extending direction of the grooves 5A is a V-shape or a U-shape so as to align the positions of the optical fibers 4 with high accuracy. The number of grooves 5A of the lower substrate 5 is generally greater than or equal to the number of optical fibers 4.

Further, the lid 6 is used as a plate-shaped lid member that presses and stabilizes the exposed portions 4A of the optical fiber 4 attached to the grooves 5A. For example, in a case where each of the grooves 5A has the V-shape, the lid 6 presses the exposed portions 4A of the optical fibers 4 to bring the exposed portions 4A of the optical fibers 4 into contact with slopes of the V-shaped grooves. Furthermore, to fix these members, a transparent ultraviolet (UV) curing adhesive is used. The ultraviolet curing adhesive is also cured by being irradiated with ultraviolet rays, and integrally bonds and fixes the members at the time of being cured. As a result, the reinforcing member 7 is formed.

Bonding positions filled with the ultraviolet curing adhesive are as follows. The bonding positions are the concave portion 5A of the lower substrate 5 and a flat surface and an end surface of the step around the concave portion 5A, an end surface of the lid 6 on a coated portion side of the optical fibers 4, and a portion where the coated portions of the optical fibers 4 are attached on the flat surface of the concave portion 5B. After these bonding positions are filled with the ultraviolet curing adhesive, the ultraviolet curing adhesive is cured by being irradiated with ultraviolet rays, thereby integrally bonding and fixing the members.

The step of the lower substrate 5 is provided to prevent the ultraviolet curing adhesive used when the lid 6 is bonded from above, from flowing to the lens-shaped portions 4' at the front end parts of the optical fibers 4. Note that, in this example, the lens-shaped portions 4' that serve as the light collecting portions at the front end parts of the optical fibers 4 in the optical fiber array 10B are used for the optical connection with the cores 2A of the optical waveguides 2 of the connection counterpart substrate 1.

Figure 4:
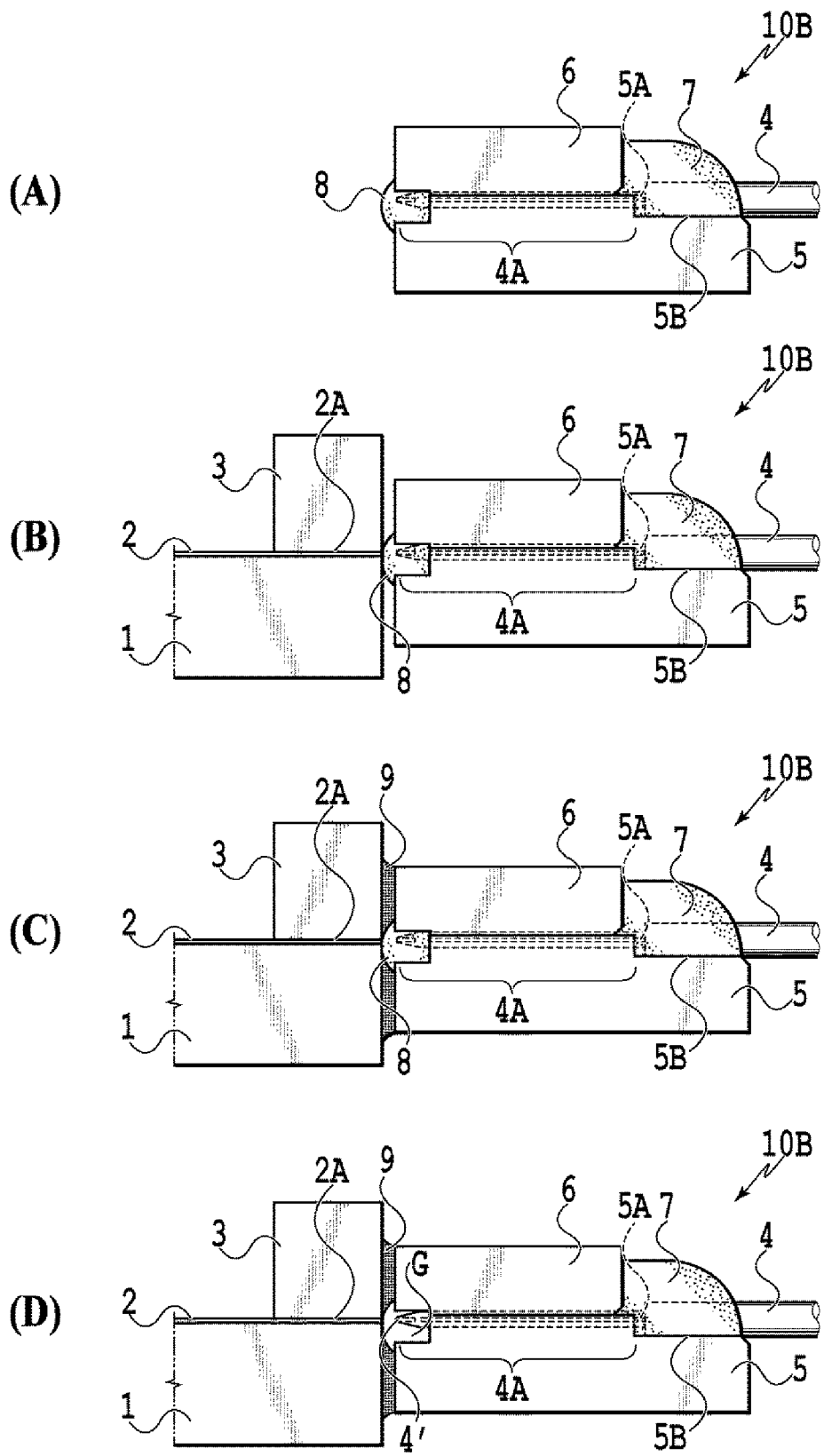
FIG. 4 is a side view illustrating steps of a connection method of coupling the optical fiber array illustrated in FIG. 2 with a connection counterpart substrate, where (A) illustrates a protective member coating step, (B) illustrates an optical alignment step, (C) illustrates a bonding fixing step, and (D) illustrates a protective member removal step.

FIG. 4 is a side view illustrating steps of a connection method of coupling the optical fiber array 10B with the connection counterpart substrate 1, where (A) illustrates a protective member coating step, (B) illustrates an optical alignment step, (C) illustrates a bonding fixing step, and (D) illustrates a protective member removal step.

As illustrated in FIG. 4(A), the protective member coating step is performed prior to coupling of the light collecting portions of the optical fibers 4 of the optical fiber array 10B and the cores 2A of the optical waveguides 2 of the connection counterpart substrate 1. First, in the protective member coating step, the lens-shaped portions 4' that serve as the light collecting portions at the front end parts of the exposed portions 4A of the optical fibers 4 are coated with a protective member 8 such as a transparent resin, to form a temporary end surface. The transparent resin is preferably small in curing shrinkage.

As illustrated in FIG. 4(B), in the optical alignment step, the optical fiber array 10B and the cores 2A of the optical waveguides 2 of the connection counterpart substrate 1 are optically aligned. The axial centers of the cores 2A of the optical waveguides 2 are optically aligned so as to be coincident in position with the axial centers of the lens-shaped portions 4' serving as the light collecting portions at the front end parts of the optical fibers 4. As a result, the optical connection is performed. Although the lens-shaped portions 4' are coated with the protective member 8 at this time, the optical alignment is performed in that state.

More specifically, the protective member 8 is slightly expanded in a convex shape from end surfaces of the lower substrate 5 and the lid 6, and a dome-shaped protrusion is accordingly formed in the horizontal direction of the lower substrate 5. At that portion, positional relationship between a height of the protrusion of the protective member 8 and the optical fibers 4 are adjusted so as to be matched with focal lengths of lenses of the lens-shaped portions 4' processed at the front end parts of the optical fibers 4. Further, in the optical alignment targeting the end surfaces of the optical waveguides 2 in the optical fiber array 10B or the like, active alignment is commonly used.

Therefore, as the resin used for formation of the protective member 8, a resin of a type having large transmittance in an optical communication wavelength band is desirably selected. The optical alignment step at this time can be performed in a manner similar to the alignment in the case of the optical fiber array 10A according to the prior art. Note that the protection glass plate 3 as a protection member is also disposed on the top surface of the connection counterpart substrate 1 on the lid 6 side.

Further, as illustrated in FIG. 4(C), the bonding fixing step is performed after the optical alignment is performed. In the bonding fixing step, the end surface of the connection counterpart substrate 1 and the end surface of the lower substrate 5 are to be bonded, and an end surface of the protection glass plate 3 on the connection counterpart substrate 1 and the end surface of the lid 6 are to be bonded. Therefore, after these bonded portions are filled with the ultraviolet curing adhesive, the ultraviolet curing adhesive is cured by being irradiated with ultraviolet rays, thereby integrally fixing the members. In the procedure, after the ultraviolet curing adhesive is dropped into the necessary portions, bonding and fixing are performed through irradiation of ultraviolet rays.

When a material adjusted such that a refractive index after curing becomes smaller than a refractive index n of glass of 1.46 is used as the ultraviolet curing adhesive, an excellent light collecting effect is obtainable. Examples of the ultraviolet curing adhesive (resin) include an ultraviolet curing adhesive having a refractive index n of 1.3 after curing.

Finally, as illustrated in FIG. 4(D), in the protective member removal step, the protective member 8 coating the lens-shaped portions 4' at the front end parts of the exposed portions 4A of the optical fibers 4 is removed by dropping a solvent such as ethanol from a side-surface direction. As a result, a gap G is formed around the lens-shaped portions 4' at the front end parts of the optical fibers 4. Note that the protection glass plate 3 and the lid 6 are not necessarily provided, and necessity of installation of the protection glass plate 3 and the lid 6 is selected depending on use environment.

As described above, in the optical fiber array 10B according to Embodiment 1, the front end parts of the exposed portions 4A of the optical fibers 4 serve as the light collecting portions each collecting light beams passing through the inside of the corresponding optical fiber 4 to reduce the MFD. Accordingly, it is possible to easily couple the optical fiber array 10B with the cores 2A of the optical waveguides 2 on the connection counterpart substrate 1 without requiring a complicated fabrication step to the connection counterpart substrate 1 and laborious diffusing fusion of the cores 2A. As a result, it is possible to perform optical connection while reducing the optical connection loss between the light collecting portions of the optical fibers 4 of the optical fiber array 10B and the cores 2A of the optical waveguides 2 of the connection counterpart substrate 1.

Further, when the light collecting portions at the front end parts of the optical fibers 4 are formed as the lens-shaped portions 4', connection and fixing are performable at the appropriate focal lengths to the end surfaces of the cores 2A of the optical waveguides 2. This makes it possible to properly reduce the optical connection loss. In other words, since the MFD at the connection interface is freely adjustable by each of the lens-shaped portions 4' at the front end parts of the optical fibers 4, it is possible to properly reduce the optical connection loss. For example, even in a case where the optical waveguides 2 of the connection counterpart substrate 1 are optical devices made of silicon or indium phosphide, each having a minute light beam diameter, it is possible to effectively reduce the optical connection loss in connection of the optical fibers 4 for optical signal transmission/reception. In other words, the optical fiber array 10B having the optical fibers 4 with such performance can be provided.

Embodiment 2

Figure 5:
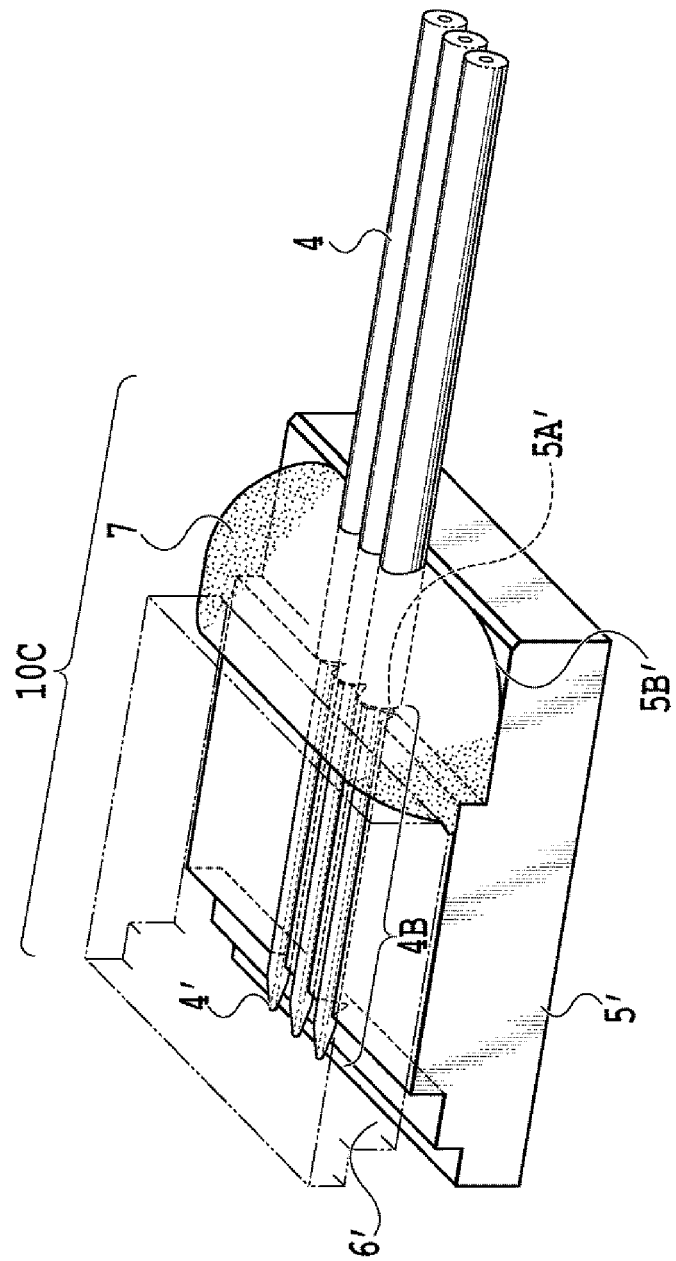
FIG. 5 is a partially-broken perspective view illustrating a basic structure of an optical fiber array according to Embodiment 2 of the present invention.
Figure 6:
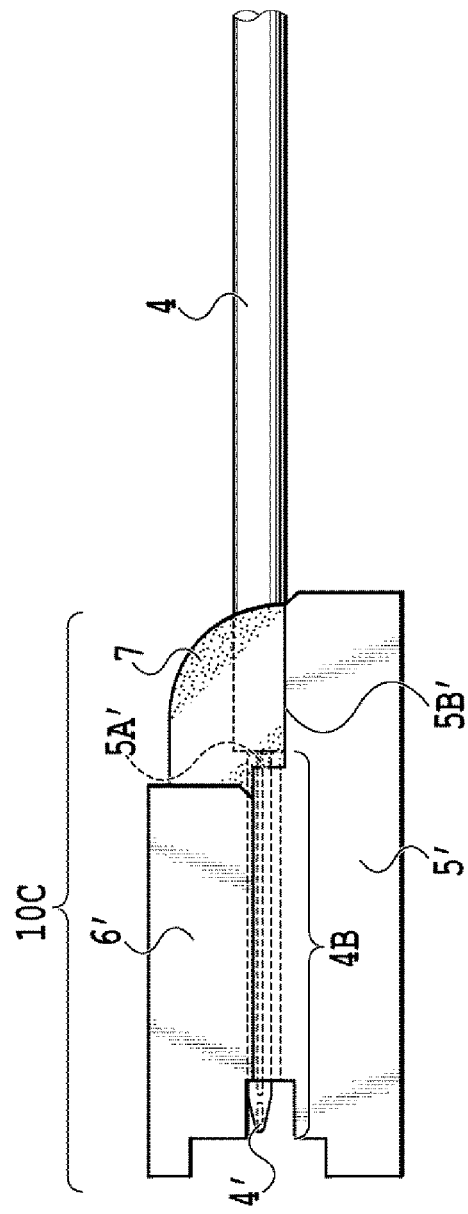
FIG. 6 is a side view of the optical fiber array illustrated in FIG. 5.

FIG. 5 is a partially-broken perspective view illustrating a basic structure of an optical fiber array 10C according to Embodiment 2 of the present invention. FIG. 6 is a side view of the optical fiber array 10C.

Referring to the drawings, the optical fiber array 10C according to Embodiment 2 is different from the optical fiber array 10B according to Embodiment 1 in that shapes of a lower substrate 5' and a lid 6' at a portion coupled with a connection counterpart substrate 1' and a protection glass plate 3' are changed. However, as in the optical fiber array 10B according to Embodiment 1, the front end parts of the exposed portions 4A of the optical fibers 4 are formed as the lens-shaped portions 4'. Note that, in the lower substrate 5', grooves 5A' on which the exposed portions 4A are attached and positioning the optical fibers 4 and a concave portion 5B' on which the coated portions of the optical fibers 4 are placed are provided to form a step, as in the optical fiber array 10B according to Embodiment 1.

In other words, in this example, the lower substrate 5' and the lid 6' are processed to have steps by cutting the connection portions with the connection counterpart substrate 1' and the protection glass plate 3'. The steps are processed so as to be matched with the focal lengths of the lenses of the lens-shaped portions 4' and to have a bonding area for securing coupling strength. The lower substrate 5' has a two-step structure in which heights of the steps are adjusted based on a thickness of the connection counterpart substrate 1' to be coupled. In addition, the lid 6' also has a step structure in which a height of the step is adjusted based on a thickness of the protection glass plate 3' to be coupled.

Figure 7:
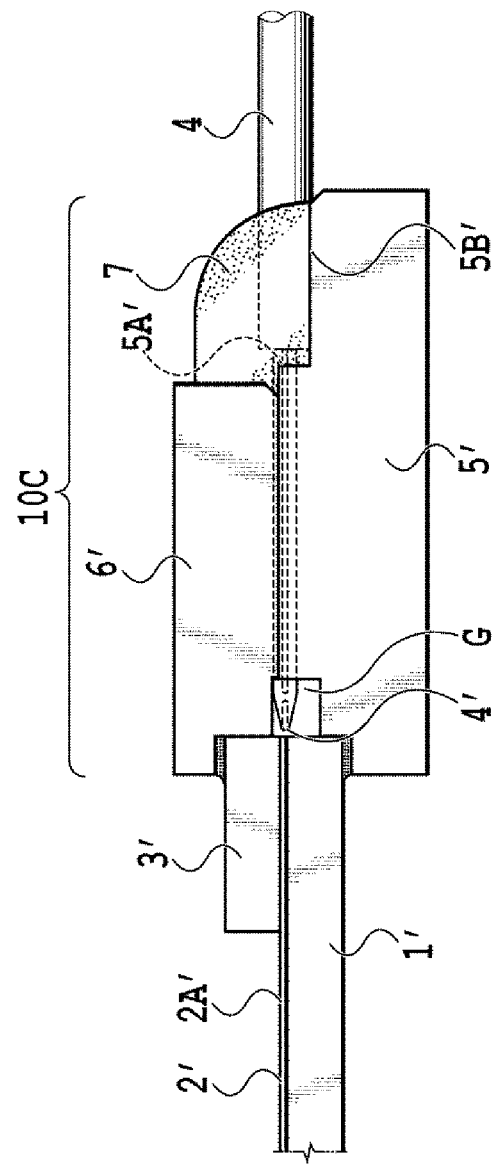
FIG. 7 is a side view illustrating a state where the optical fiber array illustrated in FIG. 5 is coupled with a connection counterpart substrate after removal of the protective member.

FIG. 7 is a side view illustrating a state where the optical fiber array 10C is coupled with the connection counterpart substrate 1' after removal of the protective member 8.

As illustrated in FIG. 7, also in this example, the coupling counterpart having a configuration in which cores 2A' of optical waveguides 2' are provided on the top surface of the slightly-thin connection counterpart substrate 1' and the slightly-thin protection glass plate 3' is disposed on the top surface of the connection counterpart substrate 1' on the lid 6' side is assumed. A method of connecting the optical fiber array 10C and the connection counterpart substrate 1' is similar to the method in Embodiment 1 except that the bonding target positions in the bonding fixing step are different. In this example, the bonding fixing step is performed after the optical alignment is performed.

The bonding target positions in the bonding fixing step according to Embodiment 2 are different from those according to Embodiment 1. One of the bonding target positions is a space between a local portion of a main surface of the connection counterpart substrate 1' and the notch of the attachment substrate 5' in a core direction of the optical fibers 4. The other bonding target position is a space between a local portion of a main surface of the protection glass plate 3' on the top surface of the connection counterpart substrate 1' and the notch of the lid 6' in the core direction of the optical fibers 4. After these spaces are filled with the ultraviolet curing adhesive, the ultraviolet curing adhesive is cured by being irradiated with ultraviolet rays, thereby integrally bonding and fixing the members. As a result, the reinforcing member 7 is formed. In the above-described step structure, the connection counterpart substrate 1' is coupled with a second step of the lower substrate 5', and the protection glass plate 3' is coupled with the step of the lid 6'. At this time, the ultraviolet curing adhesive is dropped so as not to flow into the lens-shaped portions 4' at the front end parts of the optical fibers 4.

Thereafter, the protective member 8 is removed by using a solvent in a manner similar to Embodiment 1, to form a gap G around the lens-shaped portions 4' serving as the light collecting portions at the front end parts of the optical fibers 4 as illustrated in FIG. 7. Note that the protection glass plate 3' and the lid 6' are not necessarily provided, and necessity of installation of the protection glass plate 3' and the lid 6' is selected depending on use environment.

As described above, also in the optical fiber array 10C according to Embodiment 2, the front end parts of the exposed portions 4A of the optical fibers 4 serve as the light collecting portions each collecting light beams passing through the inside of the corresponding optical fiber 4 to reduce the MFD. Further, the light collecting portions are formed as the lens-shaped portions 4'. Accordingly, action and effects similar to those in Embodiment 1 are achieved. The optical fiber array 10C according to Embodiment 2 is particularly suitable for coupling with the cores 2A' of the optical waveguides 2' of the connection counterpart substrate 1' having a low height.

The technical outlines described in the above-described embodiments can be regarded as a method of connecting the optical fiber array 10B or 10C. The connection method is based on the premise that the cores 2A or 2A' of the optical waveguides 2 or 2' formed on the top surface of the connection counterpart substrate 1 or 1' and the front end parts of the coating-removed exposed portions 4A of the optical fibers 4 are optically connected, and includes the following first to fifth steps.

In the first step, the front end parts of the exposed portions 4A of the optical fibers 4 are cut to form the light collecting portions each collecting the light beams passing through the inside of the corresponding optical fiber 4 to reduce the MFD. In the second step, the light collecting portions are coated with the protective member 8. In the third step, the cores 2A or 2A' of the optical waveguides 2 or 2' are optically aligned with the light collecting portions coated with the protective member 8, of the exposed portions 4A attached to the grooves 5A or 5A' provided on the lower substrate 5 or 5' for positioning the optical fibers 4. Note that when the exposed portions 4A of the optical fibers 4 are attached to the grooves 5A or 5A' of the lower substrate 5 or 5', the coated portions of the optical fibers 4 are preferably placed on the flat surface of the concave portion 5B or 5B' provided on the lower substrate 5 or 5' so as to form a step with the grooves 5A or 5A'.

In the fourth step, the connection counterpart substrate 1 or 1' and the lower substrate 5 or 5' are bonded and fixed after the third step. In the fifth step, the protective member 8 is removed to form the gap G around the light collecting portions after the fourth step. Note that the number of optical fibers 4 is generally two or more. Therefore, the number of parallelly-arranged grooves 5A or 5A' of the lower substrate 5 or 5' is greater than or equal to the number of optical fibers 4.

REFERENCE SIGNS LIST 1, 1' Connection counterpart substrate
2, 2' Optical waveguide
2A, 2A' Core
3, 3' Protection glass plate (protection member)
4 Optical fiber
4' Lens-shaped portion (light collecting portion)
4A Exposed portion
5, 5' Lower substrate (attachment substrate)
5A, 5A' Groove
5B, 5B' Concave portion
6, 6' Lid (lid member)
7 Reinforcing member
8 Protective member
10A, 10B, 10C Optical fiber array
G Gap

The invention claimed is:

1. An optical fiber array, comprising:
optical fibers each having a coating-removed exposed portion for positioning and fixing; and
an attachment substrate having grooves on which the exposed portions are attached and positioning the optical fibers, and a concave portion on which coated portions are placed, the grooves and the concave portion forming a step, wherein
the grooves are formed at intervals enabling optical connection between cores of optical waveguides provided on a top surface of a connection counterpart substrate and front end parts of the exposed portions of the attached optical fibers, and
the front end parts of the exposed portions of the optical fibers each include a light collecting portion that collects light beams passing through an inside of the corresponding optical fiber to reduce a mode field diameter, and
wherein the optical fiber array comprises a plate-shaped lid member pressing and stabilizing the exposed portions of the optical fibers attached to the grooves on a flat surface of the concave portion, wherein
the optical fiber array has a reinforcing member formed by bonding and fixing,
the concave portion of the attachment substrate, the flat surface of the attachment substrate, and an end surface of the step around the concave portion,
an end surface of the lid member on a coated portion side of the optical fibers, and
a portion where the coated portions of the optical fibers are attached on the flat surface of the concave portion, wherein
the light collecting portions are provided for optical alignment with the cores of the optical waveguides while being coated with a protective member,
an interface between, the connection counterpart substrate and the attachment substrate, and an interface between a protection member disposed on the connection counterpart substrate and the lid member are bonded and fixed, and
a gap is formed around the light collecting portions by removal of the protective member.

2. The optical fiber array according to claim 1, wherein each of the light collecting portions has a lens shape.

3. The optical fiber array according to claim 1, wherein a number of optical fibers is two or more, and
the grooves on the attachment substrate are parallelly-arranged with a number of the optical fibers or more.

4. The optical fiber array according to claim 1, wherein the attachment substrate and the lid member are introduced steps to match with focal lengths of the light collecting portions and to assure the bonding strength by notching connection portions with the connection counterpart substrate and the protection member.

5. A method of connecting an optical fiber array to optically connect cores of optical waveguides provided on a top surface of a connection counterpart substrate and front end parts of coating-removed exposed portions of optical fibers, the method comprising:
machining the front end parts of the exposed portions to form light collecting portions, each of the light collecting portions collecting light beams passing through an inside of the corresponding optical fiber to reduce a mode field diameter;
coating the light collecting portions with a protective member;
optically aligning the cores of the optical waveguides and the light collecting portions coated with the protective member, of the exposed portions attached to grooves provided for positioning the optical fibers on an attachment substrate;
bonding and fixing the connection counterpart substrate and the attachment substrate; and
removing the protective member to form a gap around the light collecting portions.

6. The method of connecting the optical fiber array according to claim 5, wherein
a number of the optical fibers is two or more, and
the grooves on the attachment substrate are parallelly-arranged with a number of the optical fibers or more.

* * * * *